July 28, 1953  E. A. ROCKWELL  2,646,665
FLUID PRESSURE INTENSIFYING MEANS
Filed Jan. 25, 1947  5 Sheets-Sheet 1

INVENTOR
EDWARD A. ROCKWELL
BY
ATTORNEY

July 28, 1953  E. A. ROCKWELL  2,646,665
FLUID PRESSURE INTENSIFYING MEANS
Filed Jan. 25, 1947  5 Sheets-Sheet 2
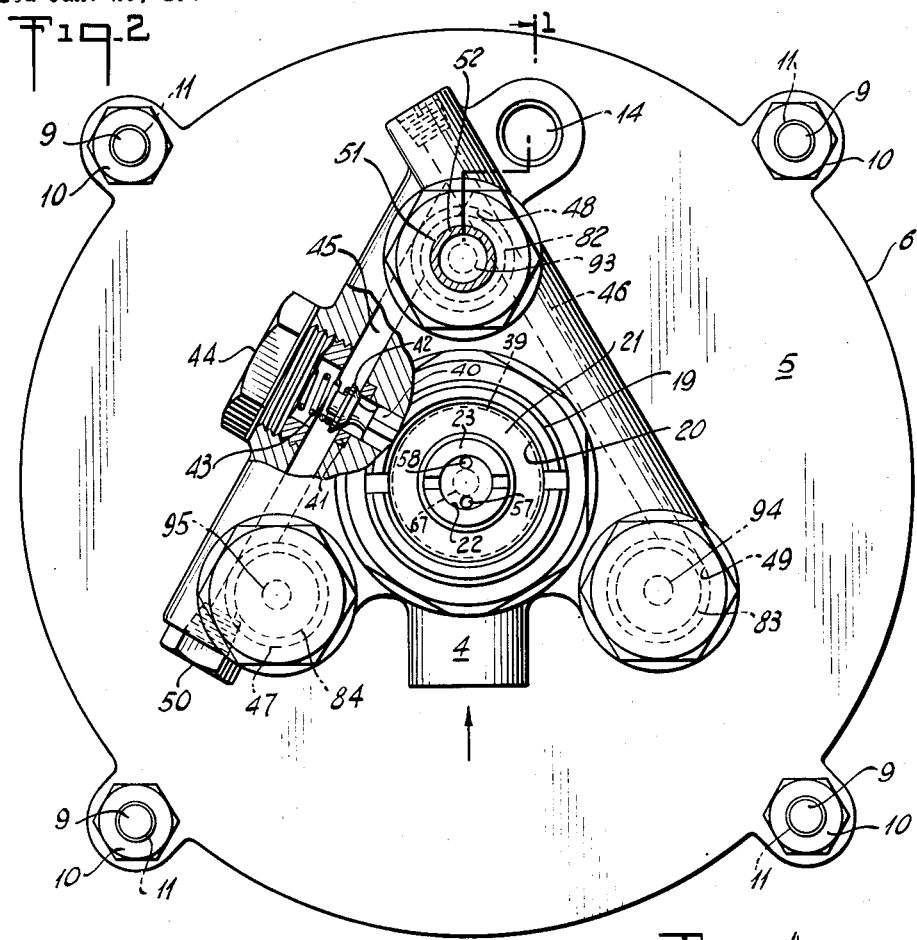
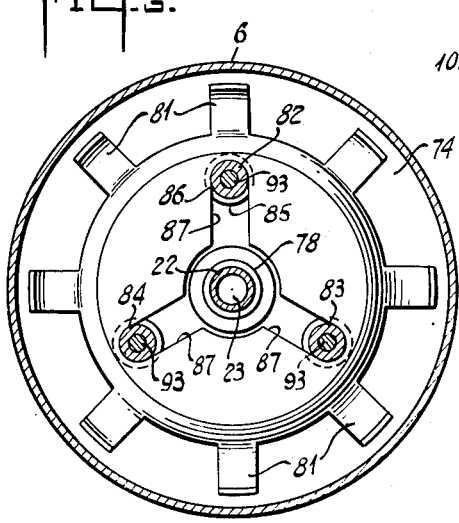
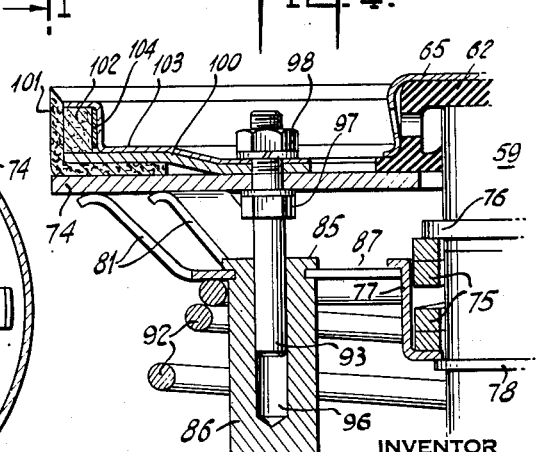
INVENTOR
EDWARD A. ROCKWELL
BY
ATTORNEY July 28, 1953     E. A. ROCKWELL     2,646,665
FLUID PRESSURE INTENSIFYING MEANS
Filed Jan. 25, 1947     5 Sheets-Sheet 3
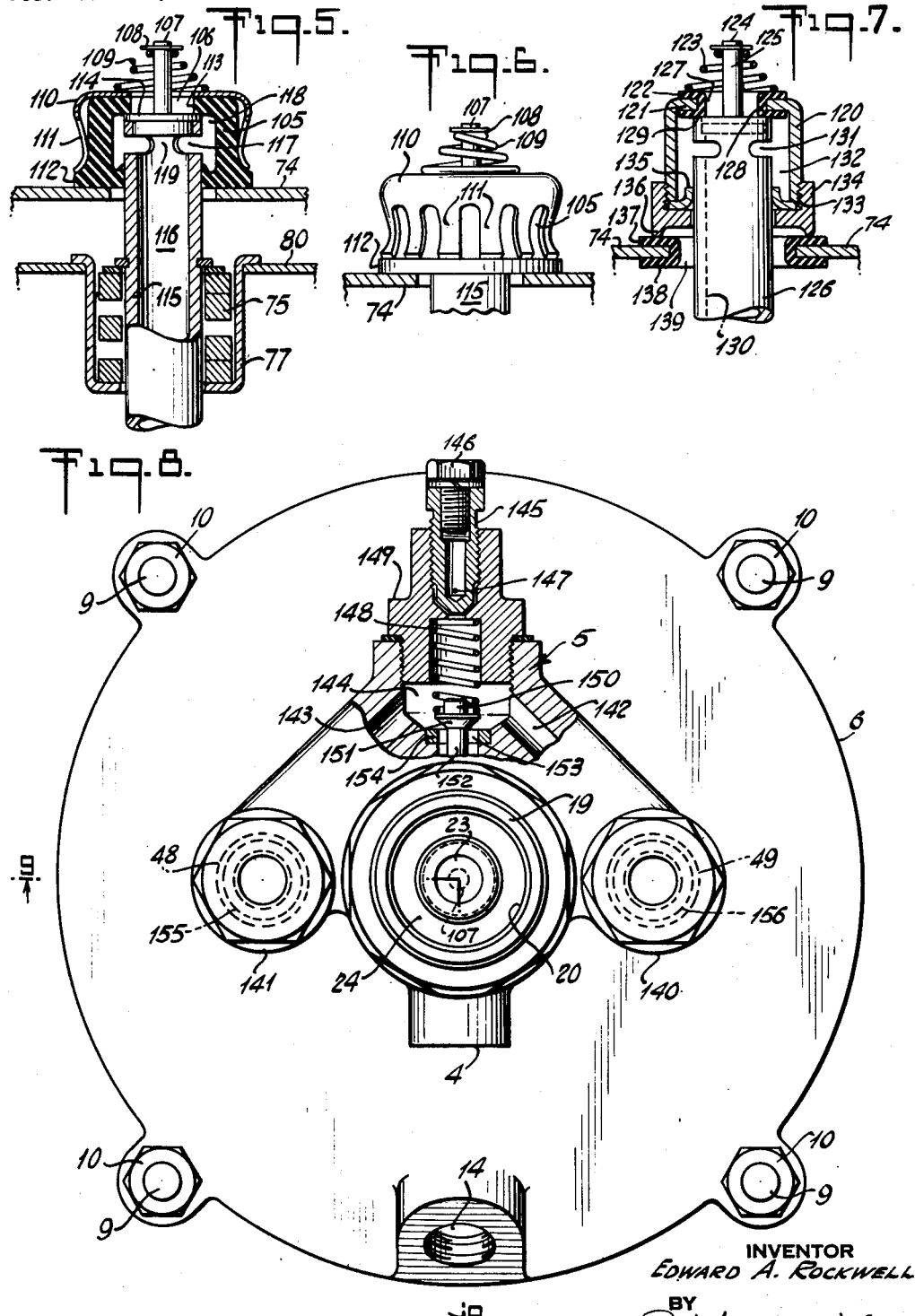
INVENTOR
*Edward A. Rockwell*
BY
*Arthur Wright*
ATTORNEY July 28, 1953  E. A. ROCKWELL  2,646,665
FLUID PRESSURE INTENSIFYING MEANS
Filed Jan. 25, 1947  5 Sheets-Sheet 4
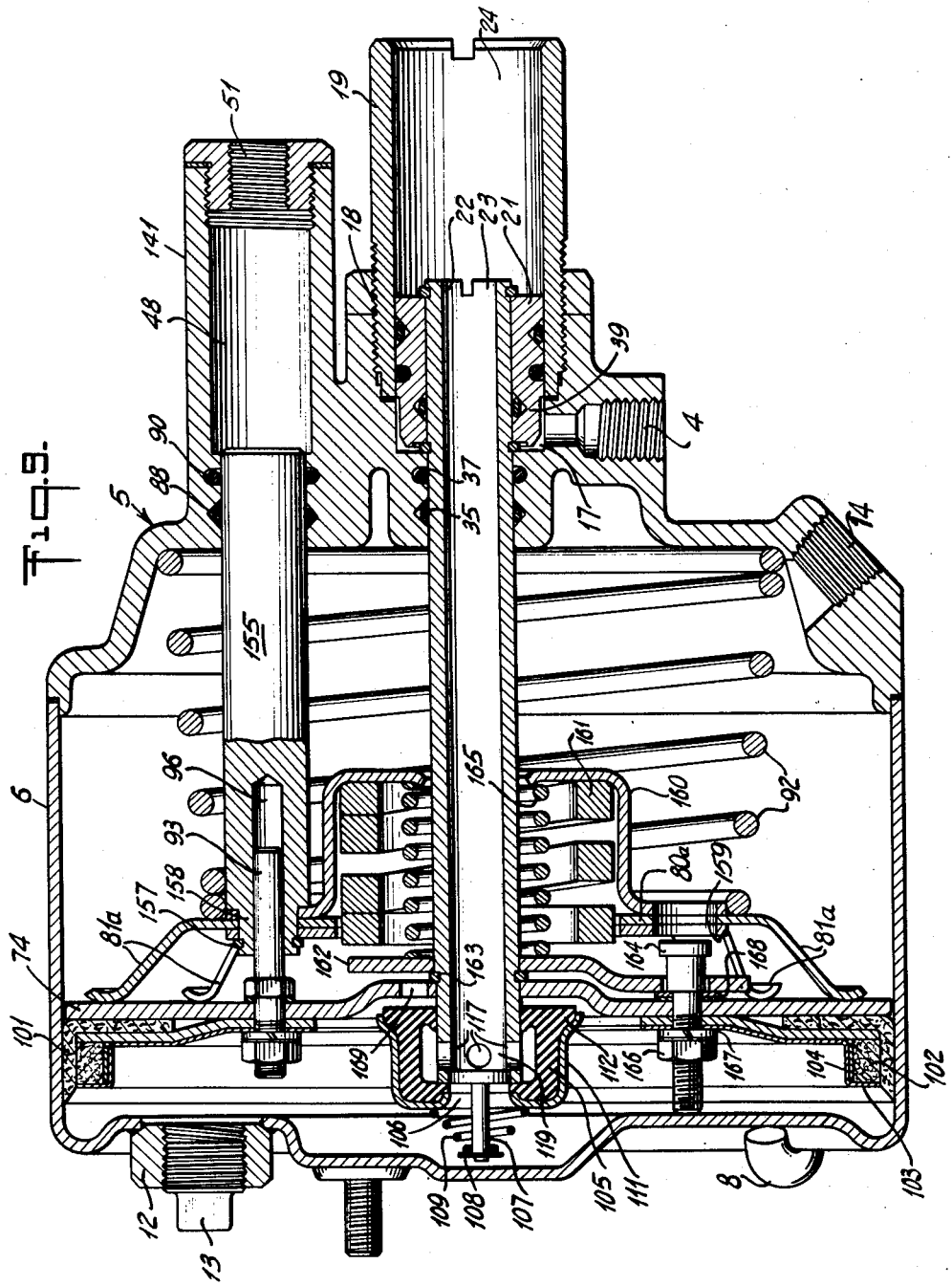
INVENTOR
EDWARD A. ROCKWELL.
BY
Arthur Wright
ATTORNEY July 28, 1953      E. A. ROCKWELL      2,646,665
FLUID PRESSURE INTENSIFYING MEANS Filed Jan. 25, 1947      5 Sheets-Sheet 5

INVENTOR
EDWARD A. ROCKWELL.
BY
Arthur Wright
ATTORNEY

Patented July 28, 1953

2,646,665

UNITED STATES PATENT OFFICE 2,646,665

FLUID PRESSURE INTENSIFYING MEANS

Edward A. Rockwell, Shaker Heights, Ohio

Application January 25, 1947, Serial No. 724,412

25 Claims. (Cl. 60—54.5)

My invention relates particularly to power units which are adapted to deliver power for work performance generally, but which, also, have special application for the delivery of power for the operation of automotive vehicle accessories, as for instance automobile brakes.

The object of my invention is to provide an improved form of power unit, by means of which the desired amount of power may be delivered more effectively and with a simpler construction. Another object is to obtain in the same form of power unit, and by the substitution of different elements therein, any desired boost ratio of input and output pressure, not limited to a fixed ratio therefore, and by means of which, furthermore, any required pedal pressures may be obtained as well as any desired output pressures. A further object is to provide lightness of construction by reason of the concentric arrangement of the parts, which balances a central control plunger, with consequent saving of material and labor in the construction of the power units. This also permits self-alignment of the movable parts of the power unit. Another object is to provide an effective control owing to the fact that in my power unit the whole piston area determines the lap position of the valves and consequently enables a fast movement of the parts to be attained. A further object is to provide an effective regulating inlet and outlet valve means. Still a further object is to provide an effective valve of this character by which the presence of an excessive pressure is prevented owing to the unseating of the air inlet valve when a vacuum greater than desired is applied thereto. Still another object is to provide an effective reaction means, the force or ratio of which may be readily changed by substitution of springs or otherwise, to control the reaction or "feel" applied to the pedal. Another object is to provide a selective set of springs so that by inserting springs of different dimensions or tensions, different boost ratios, different valve unseating positions and reaction forces may be attained.

A special purpose of this invention is to provide a unit which is adaptable to be made in a complete range of sizes from the smallest to the largest trucks and one that will be readily adaptable to an required pedal ratio to the master cylinder. Previously, in order to accomplish the adjustment of the ratio, it has been necessary to select either a special size control plunger or to change a leverage ratio connecting the plunger and the valve in the power unit. In order that the parts of the unit can be standardized so to produce a maximum of interchangeable parts at a minimum cost, in this invention it is necessary to change only the rate of a spring.

A further object of this invention is to provide a control plunger having an air inlet at one end thereof and an elastic grommet valve directly cooperating with the end of the plunger so as first to close a vacuum valve and subsequently open an air passage through the center of the plunger. This direct action eliminates the lever arrangement previously used, avoids the use of a seal and permits a slight misalignment of the vacuum piston with respect to the power plunger to be present.

A further purpose of the invention is to provide a very early cut-in point for the unit, so that the power will start to be applied almost instantaneously with the application of the pedal.

Another object is to provide a unit wherein the boost ratio may be relatively low so as to permit manual boosting pressures to be applied during the power effort.

A further object is to provide a control wherein the whole area of the pressure responsive power piston, operating against a spring plate, will be effective to determine the lap position of the control valve according to the rate of deflection of the plate. It also is a purpose to transmit this force through the spring plate directly to a plurality of power plungers equally and symmetrically spaced.

It is a further object to have a spring return for the control plunger, reacting against the power plunger or plungers so that the manual force will act through a spring selected to give the desired pedal pressure for any given mechanical linkage arrangement to the pedal. It also is an object to produce a very fast release of the brakes so as to avoid undue hysteresis in the "on" and "off" application of the brakes, that is to say, lag in coming off.

A further object is to provide a unit which can be manufactured very cheaply and one in which a single bleeder is used for both the control plunger, as well as the power plunger or plungers.

A further object is in a simple construction to use an aluminum pressure cylinder, having special types of seals which avoid the use of bushings in the manufacture of the unit, thereby saving space and cost.

Another object is to provide a removable control cylinder which can be screw-threaded into a pressure cylinder casting, and this cylinder can be made of any desired material, such as cast iron pipe or other tubing which can be manufactured cheaply on a screw machine, there being no outlets necessary to be added on the tubing itself.

Further objects of my invention will appear from the detailed description of the same hereinafter.

While my invention is capable of embodiment in many different forms, for the purpose of illustration I have shown only certain forms thereof in the accompanying drawings, in which—

Fig. 2 is an end elevation partly in section of the same;

Fig. 3 is a transverse vertical section showing the same construction except that a modified form of plunger mounting of the reaction element is shown which may be in the form of a star spring;

Fig. 4 is a fragmental vertical section of the said modified form of pressure-increasing plunger therein;

Fig. 5 is a longitudinal vertical section of a modified form of grommet valve that may be used;

Fig. 6 is a side elevation of the grommet valve shown in Fig. 5;

Fig. 7 is a longitudinal vertical section of modified inlet and outlet valves showing a valve body preferably made of metal, and having cooperating therewith elastic valve seats, such as of rubber, etc.;

Fig. 8 is an end elevation partly in section of another modification of the power unit;

Fig. 9 is a transverse section thereof in its initial position, taken on line 9—9 of Fig. 8;

Figure 1:
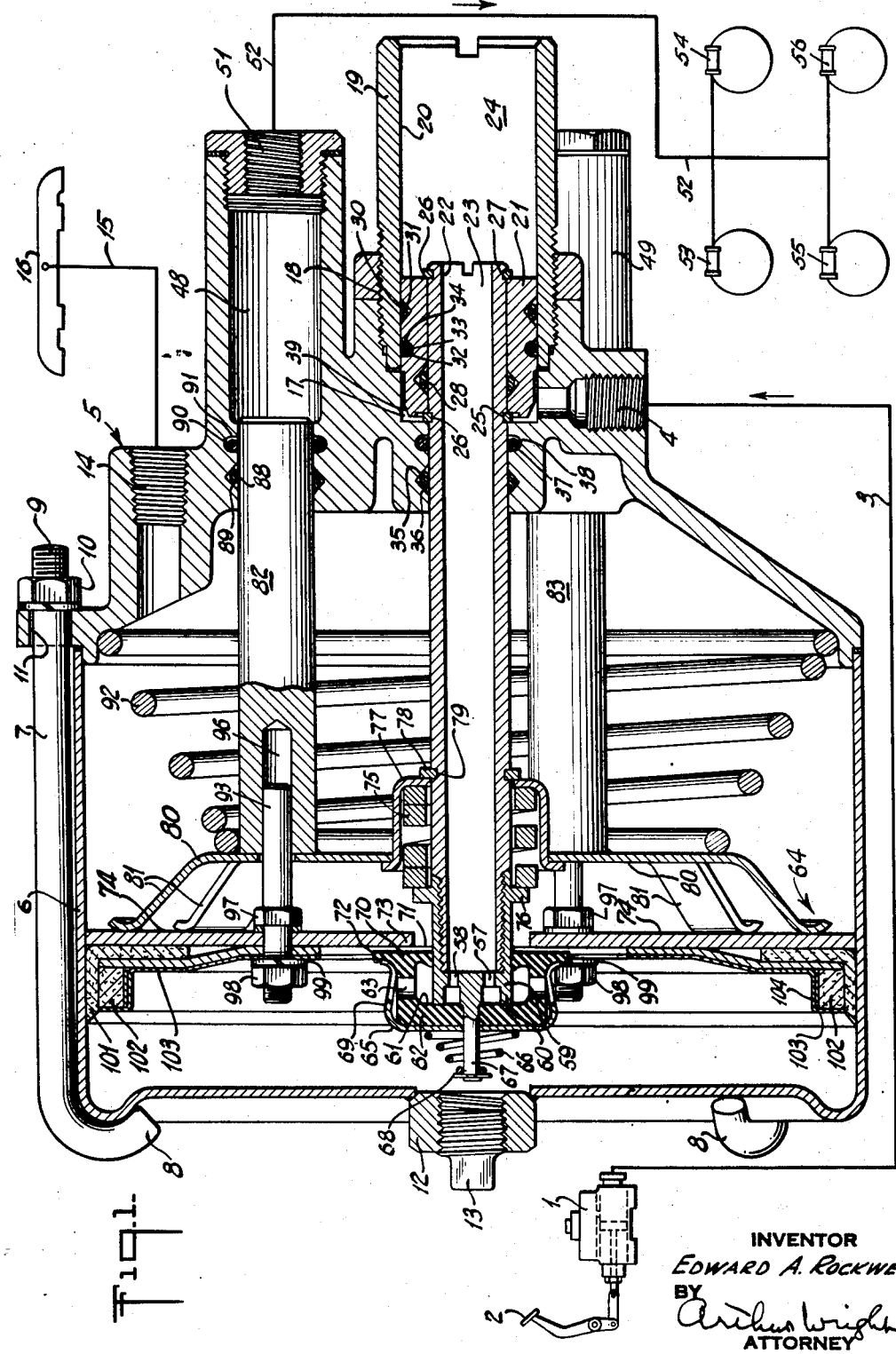
Fig. 1 is a vertical longitudinal section of a power unit made in accordance with my invention, showing one form of grommet valve in its initial position, the section being taken on line 1—1 of Fig. 2.
Figure 10:
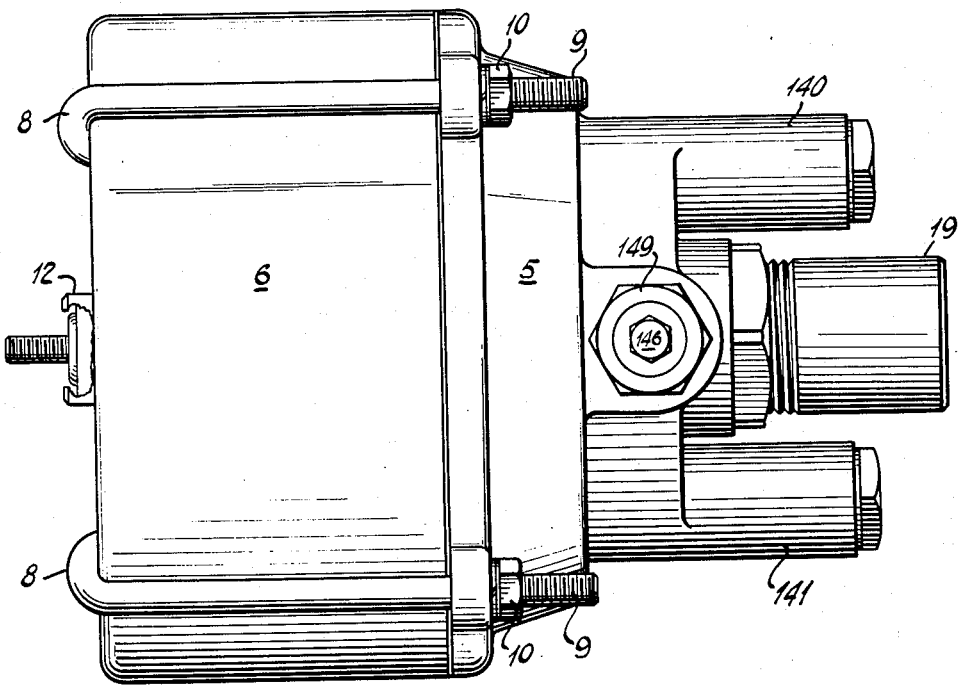
Fig. 10 is a plan view of the same.
Figure 11:
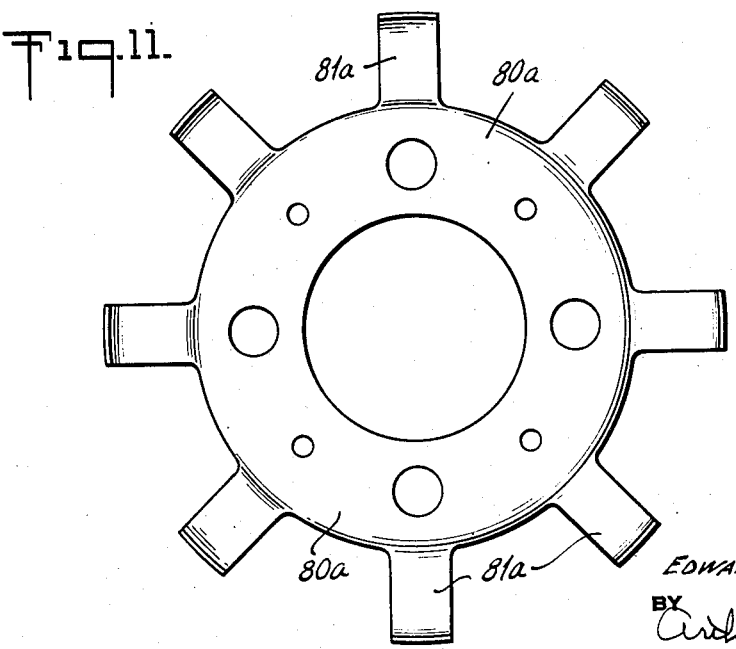
Fig. 11 is a plan view of the reaction spring plate of Figs. 8 to 10.

Referring first to Figs. 1 to 4 of the drawings, I have shown a master cylinder 1 having a pedal 2 connected by a pipe 3 to an inlet opening 4 on a power unit head 5 which may be a light casting, if desired, such for example as of aluminum or an aluminum alloy. The head 5 may be secured to a power unit casing 6 of sheet metal by means of rods 7, with hooks 8 on one end of each of the same, and screw-threaded ends 9, provided with nuts 10, which pass through holes 11 in the periphery of the head 5. The casing 6 may have secured to the same, if desired, a connection 12, screw-threaded to receive a plug 13, which may be removed and supplanted with a connection to a trailer, if desired. Also, the head 5 has a screw-threaded opening 14 connected by a pipe 15 to an automobile engine manifold 16, or to any other source of vacuum.

The inlet 4 leads to an annular chamber 17 in the head 5 adjacent to a screw-threaded opening 18 having therein a screw-threaded end of a manual or control cylinder 19 which may be of iron or steel to provide an internal cylindrical milled surface 20 for the reciprocation therein of a piston 21 located on a manual or control plunger 22 having a longitudinal air passageway 23 to convey air from an air inlet 24. The piston 21 is held in place against a shoulder 25 on the plunger 22 by means of a split ring 26 in a recess 27 on the end of the control plunger 22. Also, on the inner face of the piston 21 there is a seal of any desired character, as for instance an elastic deformable ring of rubber or rubber substitute 28, located in a V-shaped recess 29. On the outside of the piston 21 there is a low pressure seal in the form of a ring 30 of circular cross-section and which is of such a size that, initially, it has a somewhat flat outer face by being forced into a V-shaped retainer recess 31. This will provide an effective seal at all times against even low fluid pressures. Preferably, the said ring 30 is made of a rubber or similar material, which will tend to expand slightly under the influence of the brake fluids present, as for instance alcohol, castor oil, etc. Adjacent to the seal 30 there is a high pressure seal 32 of substantially the same material as the ring 30. The seal 32, which is circular in cross-section, is preferably of such a size that when inserted in the cylinder 19 it will contact only lightly with the inner face of the cylindrical chamber 20 and will leave initially and under low pressures, a free passageway 33 beneath the seal 32 within a U-shaped recess 34. When higher hydraulic pressures are being applied in the annular chamber 17, low pressures will be prevented from leakage by the seal 30 and high pressures will then be prevented from leakage by the seating of the seal 32 tightly in flat position on its periphery and side. When the high pressures are released the high pressure seal 32 will again relax to re-open the passageway 33 beneath the same to prevent trapping of the high pressure fluids between the seals 30 and 32. This construction of seals is the same as described in detail in my copending applications upon Sealing Means, Ser. No. 729,931, filed February 21, 1947, now Patent No. 2,593,193, and Unit for Delivering Intensified Power, Ser. No. 690,638, filed August 15, 1946. Also, around the control plunger 22 there is a low pressure seal 35 in a V-shaped recess 36 constructed like the low pressure seal 30 and recess 31, and a high pressure seal 37 in a U-shaped recess 38 constructed like the high pressure seal 32 and recess 33, except that in this instance the elastic deformable material of the seals 35 and 37 is preferably such as to slightly contract under the influence of the said brake fluids, such for instance as neoprene. These seals are also made in the manner described in detail in the said two copending applications for Letters Patent.

When the brake fluid has been forced into the annular passageway 17 by the operation of the pedal 2, it will force the piston 21 to the right, thus releasing a cam surface 39 on its periphery from a fluted valve rod 40 which initially has been forced to the left in Fig. 2 by the cam 39 so as to allow the hydraulic brake fluid to pass from the annular chamber 17 through a valve seat 41 which has a valve member 42 secured to the fluted valve rod 40, said valve 42 being normally pressed against its seat, when permitted by the cam 39, by a spring 43 carried in a screw-threaded plug 44 in the head 5. When the liquid thus passes through the valve 41, 42, it gains access to two connecting conduits 45 and 46 which provide communication to three power cylinders 47, 48 and 49. One end of the conduit 45 may be closed by a screw plug 50 and one end of the conduit 46 may lead by a screw-threaded outlet 51 and a pipe 52 to front wheel brake cylinders 53 and 54 and rear wheel brake cylinders 55 and 56. In this way, initially, the manual hydraulic pressures applied by the pedal 2 may pass directly to the wheel brakes 53, 54, 55 and 56 to set the brakes initially and apply a small amount of braking effort, if desired.

When, however, the hydraulic pressure from the pedal 2 is increased the cam 39 will be released from the valve rod 40, thus closing the valve 41, 42 and moving the piston 21 to the right, in Fig. 1, so as to admit air through apertures 57 and 58 in a cap 59 screw-threaded on the end of the control plunger 22 and thence past an annular valve seat 60 which normally rests on the inner face 61 of a rubber grommet valve 62, and thence by radial openings 63 in the rubber grommet valve 62 to the inside of the power unit casing 6 on the left face of a power piston 64 which slides within said cylindrical casing 6. This rubber grommet 62 is forced towards the right, in Fig. 1, against the inlet valve seat 60 with the aid of a spring retaining cap 65 which supports a coil spring 66 around a stem 67 formed on the cap 59, the spring 66 being held in place by a cotter pin 68. It will also be noted that the spring retaining cap 65 has spring arms 69 which are bent outwardly and then inwardly to place a tension inwardly on the grommet valve to aid in seating it and so as to overlie an inwardly and outwardly directed flange 70 on the grommet 62. The said flange 70 has an inwardly directed portion 71 fitting against the outer face of the cap 59 to form a seal therewith, and it has an outwardly directed flange 72 which forms an outlet valve member seating against an outlet valve seat 73 on a plate 74 forming a part of the piston 64. The outlet valve 72, 73 is initially held in open position to admit the vacuum received by the inlet 14 and at the right face of the plate 74 so as to be admitted to the left face of the plate 74 in Fig. 1. This open position of the outlet valve 72, 73 is brought about by reason of the presence of a coil control and reaction spring 75 around the control plunger 22 and which rests against a flange 76 on the right-hand end of the cap 59. The right-hand end of the coil spring 75 is carried in an annular spring cup 77 which is positioned on the control plunger 22 by a split retaining ring 78 in a recess 79 in said plunger 22. The outer edge of said cup 77, furthermore, is supported against a star reaction spring 80 having spring fingers 81, which are shown, also, in Fig. 3, and which rest against the right face of the power piston plate 74. It will be understood that this spring 80, as well as the spring fingers 81, also the spring 75, may have any desired strength or shape or tension in order to provide the desired ratio of input and output force or boost ratio requiring any desired input pressure and delivering any desired output pressure, according to the needs of the installations and that these changes can be accomplished without the necessity of making any changes in the design or construction of the other parts of the power unit apparatus. Also fastened to the star spring 80 there are provided three pressure increasing plungers 82, 83 and 84 which operate, respectively, in the pressure increasing chamber 48, 49 and 47. These plungers 82, 83 and 84 may be secured to the star spring 80 either by welding or in any other desired manner, although for this purpose, referring to Figs. 3 and 4, instead, each of said plungers may be provided with a terminal flange 85 adjacent to a cylindrical stem 86 forming a recess 87 around which the spring arms 81 pass for this purpose, as shown in Fig. 4. Each of these plungers 82, 83 and 84, furthermore, may have a low pressure annular seal 88 and a V-shaped recess 89 constructed like the seal 35 and recess 36. Also, it may have a high pressure seal 90 and a U-shaped recess 91 constructed like the high pressure seal 37 and recess 38. Furthermore, a conical retracting spring 92 is provided between the star spring 80 and the head 5 for returning the power piston 64 to its initial position. Centering dowel pins 93, 94 and 95 pass into corresponding elongated recesses 96 in the said plungers 82, 83 and 84, said dowel pins having near their left-hand ends hexagons 97 and 98 as well as washers 99 for fastening the centering dowel pins 93, 94 and 95 to the power piston plate 74, and for holding in position a seal retaining plate 100 which holds in place, around the periphery of the plate 74, a leather seal 101. A felt lubricating ring 102 carrying a liquid lubricant may also be supported against the seal retaining plate 100 by a disc 103 having an annular recess 104 for the felt ring 102.

In Fig. 5 I have shown a slight modification of the grommet valve. In this instance I provide a grommet valve 105 of rubber or some other elastic material, such as a rubber substitute, having a central air opening 106 through which projects a stem 107 mounted on a closed cap brazed to the end of the control plunger 22, said stem 107 having a cotter pin 108 for retaining a conical spring 109 against the upper face of a spring retaining cap 110 having spring arms 111 constructed like the spring arms 69, so as to be supported against a transverse flange 112 on the grommet the same as in the case of the flange 70 previously referred to. The spring 109 presses an inner edge 113, forming an inlet valve element of the opening 106, into contact with a valve seat 114 on the outer end of a control piston 115, like the control piston 22, having a longitudinal air passageway 116 leading to lateral air openings 117 so as to communicate with an air chamber 118 leading to the air valve 113, 114. The stem 107 is connected to the control piston 115 by webs 119.

In Fig. 7 I have shown a slightly modified form of the inlet and outlet valves, comprising a sleeve 120 of metal or other rigid material, having at its upper end a flange 121 fitting within a U-shaped ring 122 of rubber or rubber substitute, having supported on the upper face thereof a conical spring 123 held by a cotter pin 124 on a stem 125 secured to a control piston 126 like the control piston 22. The rubber ring 122 has a central air passageway 127, a lower inner edge 128 of which forms an air inlet valve element to cooperate with an air inlet valve seat 129 formed on the outer end of the control piston 126. Also, an air passageway 130 in the control piston 126 leads by openings 131 to an air chamber 132 on the inside of the sleeve 120 so that when the valve 128, 129 is unseated the air from the passageway 130 can pass into the left-hand end of the power unit through the passageway 127. The lower end of the sleeve 120 has a screw-thread 133 to receive a seal retaining ring 134 so as to clamp in position a leather seal 135 resting against the outside of the control plunger 126. Also, said ring 134 has at its lower edge an outlet valve element 136 which cooperates with a valve seat 137 on a U-shaped ring 138, made of rubber or rubber substitute, which is carried by the power piston plate 74. Within the ring 138 there is a central opening 139 for conveying, in the initial position of the parts, vacuum to both faces of the power piston 64.

In Figs. 8 to 11 I have shown a further modification of the power unit which is constructed like the power unit in Fig. 1, but with a grommet valve like that shown in Figs. 5 and 6, except as follows: In this instance there are provided only two power cylinders 140 and 141, which are connected, respectively, to the front and rear wheel cylinders. These power cylinders 140 and 141 are connected, respectively, to passageways 142 and 143, which lead to a valve chamber 144 having therein an air bleeder screw 145 normally closed by a removable screw 146, said screw 145 being hollow, and having a port 147 leading to the valve chamber 144. In said chamber there is a helical spring 148 seated at one end on a screw plug 149 in the head 5 and at its other end on a valve rod 150 carrying a conical valve 151 adjacent to a valve stem 152 passing through an opening 153 leading to the annular chamber 17 so that the stem 152 can be operated by the cam 39 to close off said valve 144 by seating it on its valve seat 154. The valve 144, 154 is open when starting to operate the power unit manually, but when further manual pressure is applied the valve 144, 154 is closed, and power pressure from the power cylinders 140 and 141 is thereafter applied to the brakes by power intensifying plungers 155 and 156. These pressure intensifying plungers are mounted on a star spring plate 80a having spring fingers 81a, by passing therethrough and being secured thereto by means of split rings 157 carried on reduced extensions 158 of the plungers 155 and 156, through which extend the bolts 93 which extend into the recesses 96. The ends of the plungers 155 and 156 also support in place a retaining ring 159 against the plate 80, the latter being adjacent to a dished spring supporting plate 160 around the control plunger. The dished plate 160 holds in position a strong control spring 161, the tension rate of which is selected to give the desired "feel," one end of which fits against a stop plate 162 which is supported in position on the control plunger 22 by a split ring 163 and guided by two headed fastening screws 164 on the plate 74. The tension rate of the control spring 161 will allow the pedal to build up its force as the spring plate 80a is deflected, thus determining the lap position of the vacuum and air valves. The stop plate 162 is held against the split ring 163 by a small control spring 165 which is also supported by the dished plate 160 and and normally holds the vacuum valve 112 off its seat. The spring 165 also acts to return the control plunger 22 and to allow the valve 144 to open against any trapped pressure. Each headed bolt 164 is secured to the plate 74 by a nut 166 and a lock washer 167. Spacing rings 168 hold the plates 74 and 162 apart so as to leave air ports 169 in the plate 74 uncovered by the plate 162. Also, the two screws 164 have screw-threaded ends which act as stops for the maximum manual travel, thus permitting the application of additional manual pressure after the air valve at the ports 169 is completely opened.

In the operation of my invention, referring first to Figs. 1 to 4, in the initial position of the apparatus with the vacuum being applied from the manifold 16, the piston 64 is initally vacuum suspended and the outlet or vacuum valve 72, 73 will be in open position due to the action of the coil spring 92 resting against the spring plate 80 which in turn supports the spring 75 by the ring 77, thus having the effect of freeing the valve element 72 from the valve seat 73 as the spring fingers 81 have in this position no contact or only a light contact with the plate 74. When the manual pressure exerted by the pedal is conveyed by the low pressure hydraulic liquid through the pipe 3, the said pressure will be conveyed into the annular chamber 17 and, as the cam 39 is in contact with the fluted valve stem 40, the valve 41, 42 will be in open position so that the pressure liquid is thus conveyed through passages 45 and 46 to the three pressure-increasing chambers 48, 49 and 50 and thence by the outlet opening 51 to the wheel brake cylinders 53, 54, 55 and 56, so as to set the brakes and, if desired, apply a slight braking force to the wheel brakes. When the hydraulic pressure in the pipe 3 is, thereafter, increased by the pedal 2 the cam 39 will move away from the valve rod 40, thus seating the valve 41, 42 and cutting off the manual hydraulic pressure to the wheel brake cylinders 53, 54, 55 and 56. Simultaneously, however, with this movement of the cam surface 39 to the right in Fig. 1, the piston 21 is being moved to the right in Fig. 1 against the opposition of the control spring 75. This results in the seating of the outlet valve 72, 73 so as to cut off the chamber at the left of the power piston 64 from the source of vacuum 14. Upon further pressure being applied in the pipe 3, the air inlet valve 61, 60 becomes unseated so as to admit air through the inlet valve 61, 60, through the ports 63 to the left of the power piston 64. This moves the power piston 64 to the right against the opposition of the reaction spring fingers 81 which control the power applied to the cylinders 47, 48 and 49 and, therefore, also the reaction exerted from said cylinders onto the pedal 2, which increases coordinately as the power pressure applied at the left of the piston 64 increases. These reaction spring fingers 81 not only control the reaction to the pedal 2 according to the amount of power pressure being applied, but also convey the power pressure, due to the force of the air at the left of the power piston 64, to the plurality of pressure-increasing or intensifying plungers 82, 83 and 84 which are balanced against each other to prevent any torsional leverage action on the control piston 22, in applying the fluid pressure from the cylinders 48, 49 and 50 through the pipe 52 to the wheel brake cylinders 53, 54, 55 and 56. The absence of any such leverage makes a light construction feasible. Thus, the power pressures applied by the cylinders 48, 49 and 50 are coordinated to the reaction or "feel" on the pedal 2, but when the power is being applied, this is added to the manual force exerted, so that both together apply the braking effort which is coordinate to the reaction or "feel" exerted on the pedal. However, when an increase of pressure in the cylinders 47, 48 and 49 is reached coordinate to the position of the pedal 2, the said pressure will act on the piston 64 to close the air inlet valve 60, 61, until a further movement of the pedal 2 takes place. Accordingly, also, when the manual pressure is being released or decreased in the pipe 3 the valve 72, 73 will be opened somewhat, after seating the inlet valve 60, 61, thus restoring the parts to their original position. Also, it will be understood that in the course of the operation of the power unit in this manner, if, for instance, an excessive vacuum should be present in the manifold 16 and, therefore, at the left of the piston 64 in the power unit, this will unseat the rubber grommet inlet valve 60 from the inlet valve seat 61 on the end of the control plunger 62, thus admitting some air to the interior of the power unit casing 6, at the left of the piston 64, which is thence conveyed by the pipe 15 to the intake manifold of the automobile engine, thus decreasing to that extent the consumption of gasoline in view of the vacuum decreased thereby.

By this means, furthermore, it will be seen by substitution of other springs or springs of different sizes, lengths or tensions for the control and reaction spring 75 with or without a substitution of other springs of different designs and tensions for the reaction spring 82, the boost ratio of the power unit can be readily changed as well as the input force controlled by the spring 75 and the output force controlled by the spring 80 without changing the size or shape of the other parts of the power unit apparatus. It will be understood that, if desired, the length of the coil spring 75 may be altered by choosing different locations for the snap ring 78 and the recess 79 in which it is carried, to alter the cut-in of the power or the travel point. This construction provides a power unit construction of the utmost simplicity and which may be made at a low cost, but which is adapted for securing a wide range of pressures and boosting ratios in the different installations into which it may be applied. It will also be understood that, as above indicated, a larger or smaller number of the power cylinders 48, 49 and 50 and intensifying plungers 82, 83 and 84 can be utilized instead of three such cylinders and plungers, but preferably in such a manner that the plurality of such cylinders and plungers will be balanced against one another in order to avoid placing any torque or torsional strain upon the manual plunger 22. This construction is, furthermore, advantageous for the reason that all of the input pressures react back on the pedal 2 in view of the fact that the entire area of the power piston 68 operates on the spring fingers 81 and thence onto the pedal 2.

The modified form of grommet in Figs. 5 and 6 operates in substantially the same manner as the grommet shown in the preceding figures except in this instance the air, instead of passing through the radial ports 63, passes through the single central port 106, and except that the air reaches the same by passing from the longitudinal passageway 116 through lateral ports 117 in the control plunger 115 instead of through the longitudinal ports 56, in the preceding figures.

The modified form of valve construction in Fig. 7 operates in substantially the same manner as that shown in Figs. 5 and 6. The course of the air is the same in Fig. 7 as in the preceding figures. In this instance, however, instead of having a rubber grommet, the metallic or rigid sleeve 120 admits the air past the rubber ring 128 which seats on the valve seat 129. Furthermore, instead, in this construction the metallic rigid sleeve 134 cooperates with the rubber outlet valve ring so as to withdraw the air through the outlet valve 136, 137. Besides, in this instance there is the leather annular seal 125 which seals the inlet valve 128, 129 from the outlet valve 136, 137 instead of depending upon the rubber grommet itself for establishing such seal.

The modification shown in Figs. 8 to 11 operates approximately as in Figs. 1 to 6, but in this instance the spring 109 is just strong enough to hold the air inlet valve 60, 61 closed normally. Furthermore, it will be noted that the stop plate 162 cooperates with the plate 74 to limit the travel of the control plunger, and in case of a very low vacuum the control plunger 22 can apply force through the same onto the plungers 155 and 156, thus avoiding excessive loss of pedal force due to compression of the spring 161.

It will be noticed, also, that the control of the unit introduces a well modulated travel, and that the flexibility of this action gives a very soft and rangy pedal "feel," as the whole large piston area of the piston 64 is used in acting on the fingers 81 as a control means, so that there is no hesitancy or lag in the "off" brake control. It will be seen that various input and output ratios can readily be selected according to piston size and master cylinder capacities and mechanical ratios, simply by selecting the springs in the desired ratio of their deflection rate. The pedal pressure versus line pressure characteristics can be changed by providing springs or any other suitable arrangement to give the exact characteristic which might be required by various engineers, all this being accomplished without departing from the basic construction and the use of the same standard parts. The single bleeder screw 146, mounted at the high point, also is desirable as the bleeding operation on the production line can be accomplished more quickly.

One of the very important advantages of the present power unit is that it avoids the relatively small areas and small forces in previous units, which determine the valving movement and reaction or "feel" produced on the pedal. In the present unit, as illustrated, for example in Figs. 8 to 11, the direct "feel" reaction is at least 350 pounds of force, which is nearly ten times that usually present in previous power units, and no balancing of this pressure is necessary to hold a lap position of the valve inasmuch as the reaction of the power piston for this purpose utilizes substantially the entire area of the power piston 64. The valve, therefore, can be closed by the power piston irrespective of any selected pedal position in the control range.

Also, the input and output ratios can be readily determined by specifying the relative rates of the springs 81a, 161 and 165. Besides, an early power cut-in can be easily selected, accordingly, to obtain a maximum range of pedal pressures for a given maximum brake line pressure.

The valve control provides an instantaneous and accurate pedal "feel," by large and adequate directive force, by accumulating energy during the brake operation.

Because of the large effective force applied, the valve operation is not subject to sticking or delayed release due to seal friction.

The power unit, furthermore, is advantageous as it can be made with simplified pressure casting, stampings, springs, snap rings and screw machine parts; also, inasmuch as the vacuum and air valves are combined in a single rubber or synthetic rubber grommet, having a positive direct follow-up action. Also, the seals are of a new type, giving maximum effectiveness and long life, with low friction. However, inasmuch as the secondary control spring 161 is free from the pressure piston 64 there will be a movement of the intensifying plungers 155 and 156 when the master cylinder pressure overcomes the force of the primary control spring 165. As this action proceeds the intensifying plungers 155 and 156 will move to act as the plate 74 by the fingers 81 to close the vacuum ports 169. A further movement will just slightly crack open the air valve at the left hand end of the grommet 105 by the withdrawal of the end of the plunger 22 from the inner face of the grommet 105. At this time the transition valve 151 is still slightly open and the piston 74 is about ready to contact the secondary control spring 161. Now that the power has cut in at this low manual pressure the piston assembly 74 will move to the right and the pedal 2 will follow through progressively, increasing the pressure, if desired, the resistance of the control springs 165 and 161 being determined by the rate of these springs, which will determine the pedal pressure range. The power piston 74, thus, will transmit the force produced by the modulated pressure differential, through the finger springs 81a, directly to the hydraulic plungers 155 and 156, this force being added to the manual force transmitted through the primary 165 and secondary 161 control springs, resulting in the boosted controlled brake line pressure. Since the power piston will have a slight movement, relative to the power plungers, as determined by the rate of the finger springs, it will be apparent that for any holding or lap positioning of the valves at any point in the power range, there will be a measure of the force applied to the piston due to the differential across the power piston, and it will be balanced against the finger springs. It is apparent that with these accumulated large forces determining the valving events that there will be instantaneous release and follow up.

Upon a release of the pressure on the pedal 2, the air valve on the grommet 105 will remain closed, and the control springs 161 and 165 will instantly retract the control plunger 21 and open the vacuum passages 169 so as to produce a lower differential of pressure across the piston 74 and thereby effect any desired release. The finger springs 81a will instantly balance this pressure, the vacuum valve passages 169 will shut off, and the unit will hold this particular pressure on the release until some further alteration or release of the pressure is effected by the pedal 2.

While I have described my invention above in detail I wish it to be understood that many changes may be made therein without departing from the spirit of the same.

I claim:

1. A power unit, comprising a movable wall, a cylinder in which the wall operates, a power plunger means connected to said wall, a power plunger chamber, a connection on the power unit adapted to be connected to a source of pressure differing from the atmospheric pressure, valve means, including an air valve and a valve, for controlling the access of the said pressure to the movable wall, and a control piston having an air vent therein for moving said valves located coaxially with regard to the movable wall and concentrically with the power plunger means around said axis.

2. A power unit, comprising a movable wall, a cylinder in which the wall operates, a power plunger means connected to said wall, a power plunger chamber, a connection on the power unit adapted to be connected to a source of pressure differing from the atmospheric pressure, valve means, including an air valve and a valve, mounted on said wall, for controlling the access of said pressure to the movable wall, and a control piston, having an air vent therein, for moving said valves located coaxially with regard to the movable wall and concentrically with the power plunger means around said axis and movable relatively to the valve means, on the same side of the wall as the power plunger.

3. A power unit, comprising a movable wall, a cylinder in which the wall operates, a power plunger means connected to said wall, a power plunger chamber, a connection on the power unit adapted to be connected to a source of pressure differing from the atmospheric pressure, valve means, including an air valve and a valve, mounted for relative movement on said wall, for controlling the access of the said pressure to the movable wall, and a control piston, having an air vent therein, for moving said valves located coaxially with regard to the movable wall and concentrically with the power plunger means around said axis and movable relatively to the valve means, on the same side of the wall as the power plunger.

4. A power unit, comprising a movable wall, a cylinder in which the wall operates, a plurality of power plungers located in balanced relation to one another connected to said wall, a plurality of power plunger chambers, a connection on the power unit adapted to be connected to a source of pressure differing from the atmospheric pressure, valve means, including an air valve and a valve for controlling the access of the said pressure to the movable wall, and a control piston for moving said valves located coaxially with regard to the movable wall and concentrically with the location of the power plungers around said axis.

5. A power unit, comprising a movable wall, a cylinder in which the wall operates, a power plunger means connected to said wall, a power plunger chamber, a connection on the power unit adapted to be connected to a source of pressure differing from the atmospheric pressure, valve means, including an air valve and a valve for controlling the access of the said pressure to the movable wall, and a control plunger, having an air vent therein, for moving said valves located coaxially with regard to the movable wall and concentrically with the power plunger means around said axis, said control plunger having a reaction spring operated by the movable wall.

6. A power unit, comprising a movable wall, a cylinder in which the wall operates, a plurality of power plungers located in balanced relation to one another connected to said wall, a plurality of power plunger chambers, a connection on the power unit adapted to be connected to a source of pressure differing from the atmospheric pressure, valve means, including an air valve and a valve for controlling the access of the said pressure to the movable wall, and a control plunger for moving said valves located coaxially with regard to the movable wall and concentrically with the location of the power plungers around said axis, said control plunger having a reaction spring operated by the movable wall.

7. A power unit, comprising a movable wall, a cylinder in which the wall operates, a power plunger means connected to sad wall, a power plunger chamber, a connection on the power unit adapted to be connected to a source of pressure differing from the atmospheric pressure, valve means, including an air valve and a valve for controlling the access of the said pressure to the movable wall, and a control plunger, having an air vent therein, for moving said valves located coaxially with regard to the movable wall and concentrically with the power plunger means around said axis, said control plunger having a star-shaped reaction spring operated by the movable wall.

8. A power unit, comprising a movable wall, a cylinder in which the wall operates, a plurality of power plungers located in balanced relation to one another connected to said wall, a plurality of power plunger chambers, a connection on the power unit adapted to be connected to a source of pressure differing from the atmospheric pressure, valve means, including an air valve and a valve for controlling the access of the said pressure to the movable wall, and a control plunger, having an air vent therein, for moving said valves located coaxially with regard to the movable wall and concentrically with the location of the power plungers around said axis, said control plunger having a star-shaped reaction spring operated by the movable wall.

9. A power unit, comprising a movable wall, a cylinder in which the wall operates, a power plunger means connected to said wall, a power plunger chamber, a connection on the power unit adapted to be connected to a source differing from the atmospheric pressure, valve means, including an air valve and a valve for controlling the access of said pressure to the movable wall, and a control plunger for moving said valves located coaxially with regard to the movable wall and concentrically with the power plunger means around said axis, said control plunger having an output reaction spring operated by the movable wall and an input control spring.

10. A power unit, comprising a movable wall, a cylinder in which the wall operates, a plurality of power plungers located in balanced relation to one another connected to said wall, a plurality of power plunger chambers, a connection on the power unit adapted to be connected to a source of pressure differing from the atmospheric pressure, valve means, including an air valve and a valve for controlling the access of the said pressure to the movable wall, and a control plunger for moving said valves located coaxially with regard to the movable wall and concentrically with the location of the power plungers around said axis, said control plunger having an output reaction spring operated by the movable wall and an input control spring.

11. A power unit, comprising a movable wall, a cylinder in which the wall operates, a plurality of power plungers located in balanced relation to one another connected to said wall, a plurality of power plunger chambers, a connection on the power unit adapted to be connected to a source of pressure differing from the atmospheric pressure, valve means, including an air valve and a valve for controlling the access of the said pressure to the movable wall, a control plunger for moving said valves located coaxially with regard to the movable wall and concentrically with the location of the power plungers around said axis, and a passageway connecting the plurality of power plunger chambers.

12. A power unit, comprising a movable wall, a cylinder in which the wall operates, a plurality of power plungers located in balanced relation to one another connected to said wall, a plurality of power plunger chambers, a connection on the power unit adapted to be connected to a source of pressure differing from the atmospheric pressure, valve means, including an air valve and a valve for controlling the access of the said pressure to the movable wall, a control plunger, having a cylinder, for moving said valves located coaxially with regard to the movable wall and concentrically with the location of the plungers around said axis, a passageway connecting the plurality of power plunger chambers, and a valve between the power plunger chambers and the control plunger cylinder operated by the control plunger.

13. A power unit, comprising a movable wall, a cylinder in which the wall operates, a plurality of power plungers located in balanced relation to one another connected to said wall, a plurality of power plunger chambers, a connection on the power unit adapted to be connected to a source of pressure differing from the atmospheric pressure, valve means, including an air valve and a valve for controlling the access of the said pressure to the movable wall, and a control plunger for moving said valves located coaxially with regard to the movable wall and concentrically with the location of the paper plungers around said axis, said valve means being associated with said control plunger.

14. A power unit, comprising a movable wall, a cylinder in which the wall operates, a plurality of power plungers located in balanced relation to one another connected to said wall, a plurality of power plunger chambers, a connection on the power unit adapted to be connected to a source of pressure differing from the atmospheric pressure, valve means, including an air valve and a valve for controlling the access of the said pressure to the movable wall, and a control plunger for moving said valves located coaxially with regard to the movable wall and concentrically with the location of the power plungers around said axis, said valve means being associated with said control plunger and being in the form of a grommet having flexible inlet and outlet valve elements.

15. A power unit, comprising a movable wall, a cylinder in which the wall operates, a plurality of power plungers located in balanced relation to one another connected to said wall, a plurality of power plunger chambers, a connection on the power unit adapted to be connected to a source of pressure differing from the atmospheric pressure, valve means, including an air valve and a valve for controlling the access of the said pressure to the movable wall, and a control plunger for moving said valves located coaxially with regard to the movable wall and concentrically with the location of the power plunger around said axis, said valve means being associated with said control plunger and being in the form of a rubber grommet having flexible inlet and outlet valve elements on the inside and outside of the grommet, respectively.

16. A power unit, comprising a movable wall, a cylinder in which the wall operates, a plurality of power plungers located in balanced relation to one another connected to said wall, a plurality of power plunger chambers, a connection on the power unit adapted to be connected to a source of pressure differing from the atmospheric pressure, valve means, including an air valve and a valve for controlling the access of the said pressure to the movable wall, and a control plunger for moving said valves located coaxially with regard to the movable wall and concentrically with the location of the power plungers around said axis, said valve means being associated with said control plunger and having an inlet valve supporting spring yieldable to excessive differences of pressure so as to open the inlet valve.

17. A power unit, comprising a movable wall, a cylinder in which the wall operates, a plurality of power plungers located in balanced relation to one another connected to said wall, a plurality of power plunger chambers, a connection on the power unit adapted to be connected to a source of pressure differing from the atmospheric pressure, valve means, including an air valve and a valve for controlling the access of the said pressure to the movable wall, and a control plunger for moving said valves located coaxially with regard to the movable wall and concentrically with the location of the power plungers around said axis, said valve means being associated with said control plunger and having an inlet valve supporting spring yieldable to excessive differences of pressure so as to open the inlet valve and a control spring on the control plunger for controlling the actuation of the valve means.

18. A power unit, comprising a movable wall, a cylinder in which the wall operates, a power plunger means connected to said wall, a power plunger chamber, a connection on the power unit adapted to be connected to a source of pressure differing from the atmospheric pressure, valve means, including an air valve and a valve for controlling the access of the said pressure to the movable wall, and a control plunger, having an air vent therein, for moving said valves located coaxially with regard to the movable wall and concentrically with the power plunger means around said axis and having a reaction spring movable with said wall in opposition to the movement of the control plunger.

19. A power unit, comprising a movable wall, a cylinder in which the wall operates, a power plunger means connected to said wall, a power plunger chamber, a connection on the power unit adapted to be connected to a source of pressure differing from the atmospheric pressure, valve means, including an air valve and a valve for controlling the access of the said pressure to the movable wall, and a control plunger, having an air vent therein, for moving said valves located coaxially with regard to the movable wall and concentrically with the plunger means around said axis and having a reaction spring, on which the power plunger means is mounted, movable with said wall in opposition to the movement of the control plunger.

20. A power unit, comprising a movable wall, a cylinder in which the wall operates, a power plunger means connected to said wall, a power plunger chamber, a connection on the power unit adapted to be connected to a source of pressure differing from the atmospheric pressure, valve means, including an air valve and a valve for controlling the access of the said pressure to the movable wall, and a control plunger, having an air vent therein, for moving said valves located coaxially with regard to the movable wall and concentrically with the power plunger means around said axis and having a reaction spring, on which the power plunger means is mounted, movable with said wall in opposition to the movement of the control plunger and a valve control spring on the control plunger and connected to the reaction spring.

21. A power unit, comprising a movable wall, a cylinder in which the wall operates, a power plunger means comprised of two plungers equidistant from the center of and connected to said wall, a power plunger chamber, a connection on the power unit adapted to be connected to a source of pressure differing from the atmospheric pressure, a valve means, including an air valve and a valve, for controlling the access of the said pressure to the movable wall, and a control piston having an air vent for moving said valves located coaxially with regard to the movable wall and concentrically with the power plunger means around said axis.

22. A power unit, comprising a movable wall, a cylinder in which the wall operates, a power plunger means connected to said wall, a power plunger chamber, a connection on the power unit adapted to be connected to a source of pressure differing from the atmospheric pressure, valve means, including an air valve and a valve, for controlling the access of the said pressure to the movable wall, and a control plunger for moving said valves located coaxially with regard to the movable wall and concentrically with the power plunger means around said axis, said control plunger having an output reaction spring operated by the movable wall, an input control spring exerting force from the control plunger on the power plunger, and a stop plate for the control spring on the control plunger.

23. A power unit, comprising a movable wall, a cylinder in which the wall operates, a plurality of power plungers located in balanced relation to one another connected to said wall, a plurality of power plunger chambers, a connection on the power unit adapted to be connected to a source of pressure differing from the atmospheric pressure, a valve means, including an air valve and a valve, for controlling the access of the said pressure to the movable wall, and a control plunger for moving said valves located coaxially with regard to the movable wall and concentrically with the location of the power plungers around said axis, said control plunger having an output reaction spring operated by the movable wall, an input control spring exerting force from the control plunger on the power plunger, and a stop plate for the control spring on the control plunger.

24. A power unit, comprising a movable wall, a cylinder in which the wall operates, a power plunger means connected to said wall, a power plunger chamber, a connection on the power unit adapted to be connected to a source of pressure differing from the atmospheric pressure, a valve means, including an air valve and a valve, for controlling the access of the said pressure to the movable wall, and a control plunger for moving said valves located coaxially with regard to the movable wall and concentrically with the power plunger means around said axis, said control plunger having an output reaction spring operated by the movable wall, an input control spring exerting force from the control plunger on the power plunger, and a stop plate for the control spring and reaction spring on the control plunger.

25. A power unit, comprising a movable wall, a cylinder in which the wall operates, a plurality of power plungers located in balanced relation to one another connected to said wall, a plurality of power plunger chambers, a connection on the power unit adapted to be connected to a source of pressure differing from the atmospheric pressure, valve means, including an air valve and a valve, for controlling the access of the said pressure to the movable wall, and a control plunger for moving said valves located coaxially with regard to the movable wall and concentrically with the location of the power plungers around said axis, said control plunger having an output reaction spring operated by the movable wall, an input control spring exerting force from the control plunger on the power plunger, and a stop plate for the control spring and reaction spring on the control plunger.

EDWARD A. ROCKWELL.

References Cited in the file of this patent

UNITED STATES PATENTS

| Number | Name | Date |
| --- | --- | --- |
| 1,781,868 | Bragg | Nov. 18, 1930 |
| 2,275,697 | Stelzer | Mar. 10, 1942 |
| 2,289,043 | Rockwell | July 7, 1942 |
| 2,308,460 | Stelzer | Jan. 12, 1943 |
| 2,359,687 | Stelzer | Oct. 3, 1944 |